United States Patent [19]

Kakodkar et al.

[11] Patent Number: 5,087,359

[45] Date of Patent: Feb. 11, 1992

[54] QUATERNIZED PEI SILICA SOLID SUPPORTS FOR CHROMATOGRAPHY

[75] Inventors: Sunil V. Kakodkar, Bethlehem, Pa.; Hugh E. Ramsden, Scotch Plains, N.J.

[73] Assignee: J. T. Baker Inc., Phillipsburg, N.J.

[21] Appl. No.: 711,119

[22] Filed: Jun. 4, 1991

Related U.S. Application Data

[63] Continuation of Ser. No. 390,324, Aug. 7, 1989, abandoned.

[51] Int. Cl.⁵ .............................................. B01D 15/08
[52] U.S. Cl. ............................ 210/198.2; 210/502.1; 210/635; 210/656; 55/386; 502/158; 502/164; 502/402; 502/407
[58] Field of Search ............... 210/635, 656, 198.2, 210/263, 679, 691, 502.1; 502/158, 402, 407, 164; 521/32, 36; 55/386

[56] References Cited

U.S. PATENT DOCUMENTS

| | | | |
|---|---|---|---|
| 3,784,489 | 1/1974 | Dales | 521/30 |
| 4,013,507 | 3/1977 | Rembaum | 435/194 |
| 4,026,987 | 5/1977 | Yarnell | 210/673 |
| 4,118,316 | 10/1978 | Talley | 210/635 |
| 4,161,581 | 7/1979 | Wagner | 528/403 |
| 4,273,873 | 6/1981 | Sugitachi | 435/180 |
| 4,276,406 | 6/1981 | Monnerat | 502/159 |
| 4,341,658 | 7/1982 | Monnerat | 502/168 |
| 4,425,238 | 1/1984 | Degen | 210/666 |
| 4,469,630 | 9/1984 | Flashner | 530/387 |
| 4,522,724 | 6/1985 | Ramsden | 210/656 |
| 4,523,997 | 6/1985 | Crane | 210/635 |
| 4,540,486 | 9/1985 | Ramsden | 210/198.2 |
| 4,569,917 | 2/1986 | Maier | 210/635 |
| 4,601,828 | 7/1986 | Gershoni | 210/635 |
| 4,650,784 | 3/1987 | Ramsden | 210/198.2 |
| 4,661,248 | 8/1987 | Ramsden | 210/502.1 |
| 4,663,163 | 5/1987 | Hou | 210/635 |
| 4,680,120 | 7/1987 | Ramsden | 210/635 |
| 4,680,121 | 7/1987 | Ramsden | 210/635 |

OTHER PUBLICATIONS

Rounds, "Factors Contributing to Intrinsic Loading Capacity in Silica-Based Packing Materials for Preparative Anion-Exchange Protein Chromatography", Journal of Chromatography, 362 (1986) pp. 187–196.

Tice, "Effects of Large Sample Loads on Column Lifetime in Preparative-Scale Liquid Chromatography," Journal of Chromatography, 411 (1987), pp. 452–455.

Mazsaroff, "Facile Preparation of a Non-porous Strong Anion Exchange Column for Proteins," Journal of Chomatography, 411 (1987) pp. 452–455.

Drager, "High Performance Anion Exchange Chromatography of Oligonucleotides," Analytical Biochemistry, 145(1) pp 47–56 (1985).

Primary Examiner—Ernest G. Therkorn
Attorney, Agent, or Firm—Parmelee, Bollinger & Bramblett

[57] ABSTRACT

Quaternized non-crosslinked polyethyleneimine silica based solid supports are useful strong anion exchangers for column chromatography separation and purification of proteins and have high binding capacity at high pH, the ability to bind basic proteins having high pH isoelectric points and are rapidly equilibrated and are essentially non-titratable.

13 Claims, No Drawings

5,087,359

QUATERNIZED PEI SILICA SOLID SUPPORTS FOR CHROMATOGRAPHY

FIELD OF THE INVENTION

This is a continuation of application Ser. No. 07/390,324 filed on Aug. 7, 1989 now abandoned.

This invention relates to novel solid, bonded phase silica products, their use in the separation and purification of proteins, especially basic proteins at high pH, and the preparation of said bonded phase products. More particularly, this invention relates to quaternized non-crosslinked polyethyleneimine bonded phase silica products, their use as solid phases supports for column packing in liquid chromatography for the separation and purification of proteins, especially of basic proteins having high pH isoelectric points and the preparation of said solid supports.

BACKGROUND OF THE INVENTION

Recently, new non-crosslinked covalently bound polyethyleneiminopropyl trimethoxy silane silica gel (PEI-PrSi-Silica gel) and polyethyleneiminopropyl trimethoxy silane controlled pore glass (PEI-PrSi-CPG) bonded phase products for column chromatography have been described by Hugh Ramsden in his U.S. Pat. No. 4,540,486, issued Sept. 10, 1985, as being useful for the separation and analysis of protein mixtures.

While such PEI-Pr-Silica gel and PEI-PrSi-CPG bonded phase products have been found to be quite useful as solid phases for column packing in liquid chromatography for the separation and purification of proteins, these novel bonded phases were not sufficiently strong cation exchanger for certain proteins, especially proteins having low isoelectric points, that is, below about 5 or so. Accordingly, novel sulfonic derivatives of N-acylated covalently bound, non-crosslinked polyethyleneimine bonded phase silicas or controlled pore glasses were provided, as disclosed in Hugh Ramsden and David Nau, U.S. Pat. Nos. 4,661,248 and 4,721,573, which issued on Apr. 25, 1987 and Jan. 26, 1988, respectively.

However, neither the original non-crosslinked covalently bound PEI-PrSi-Silica gel or PEI-PrSi-CPG bonded phase products nor the sulfonic derivatives of the N-acylated PEI-PrSi-Silica gel or PEI-PrSi-CPG are particularly useful for binding and separating basic proteins at a high pH, such proteins as cytochrome, lysozyme and the like. The solid phase supports of the Ramsden and Nau patents are cationic exchangers useful at low pH. The PEI-PrSi-Silica gel and PEI-PrSi-CPG solid phase supports of the aforementioned Ramsden patent are weak anion exchangers binding only at about pH 8.5 and below and it becomes necessary to titrate or protonate the surface of such support for purification of basic proteins.

It is therefore desirable that a solid based support which is a strong anion exchanger for chromatography of proteins be available which would be susceptible to rapid equilibration and does not involve titration of the support, which has a high capacity at high pH and has the ability to bind basic proteins having high pH isoelectric points, i.e. above about pH 9.

It is also desirable that a convenient method for the preparation of such a strong anion exchanger be available for the production of same and without any extensive product side reactions that would be harmful to the surface of the solid phase bonded support.

SUMMARY OF THE INVENTION

Solid phase bonded supports which are strong anion exchangers for chromatography, especially for chromatography of basic proteins at high pH, are provided by quaternized PEI-PrSi-Silica gel and PEI-PrSi-CPG bonded phase products.

The novel quaternized polyethyleneimine solid phase supports are prepared by a process in which the PEI-PrSi-Silica gel and PEI-PrSi-CPG are subjected to reductive-methylation by an Eschweiler-Clarke reaction to theoretically convert all the primary and secondary amines of the PEI-PrSi-Silica gel and PEI-PrSi-CPG bonded phases to tertiary amines followed by the reaction of the tertiary amines of said product with a quaternization reagent, such as a -methyl halide, preferably methyl chloride, to produce the desired novel quaternized polyethyleneimine solid phase anion exchangers.

DETAILED DESCRIPTION OF THE INVENTION

The covalently bound, non-crosslinked polyethyleneimine silica based solid supports employed to provide the novel quaternized solid phase products of this invention are the reaction products of polyethyleneiminopropyl trimethoxy silane with particulate silica gel or particulate controlled pore glass which, for the purposes of the present invention, are designated by the general formula:

Silica-PrSi-PEI.

The term Silica-PrSi-PEI as used in this invention means the covalently bound, non-crosslinked polyethyleneimine bonded phase solid support which is the reaction product of (1) either a) particulate silica gel having an average particle diameter of from about 1 to 200, preferably 3 to 70, microns and an average pore size of from about 0 to 1000, preferably about 50 to 1000 Angstrom units, or b) particulate controlled pore glass having an average particle diameter of from about 1 to about 200 microns and an average pore size of from about 0, preferably about 40, to about 1000 Angstrom units, with (2) polyethyleneiminopropyl trimethoxy silane having an average molecular weight of from about 400 to about 1800. Such Silica-PrSi-PEI products, and their preparation are disclosed and claimed in the aforementioned U.S. Pat. No. 4,540,486. Such products are currently available from J. T. Baker Inc. as BAKERBOND ® column chromatography matrixes.

The novel solid phase chromatography supports of this invention are quaternized Silica-PrSi-PEI supports in which the primary and secondary amino groups of the polyethyleneimine (PEI) moiety have been converted to tertiary amino groups and the tertiary amino groups subsequently quaternized with a suitable quaternization reagent which is capable of quaternizing the tertiary amino group of the PEI moiety.

Thus, the quaternized PEI based chromatography supports of this invention may be represented by the idealized general formula Silica-PrSi→X⁻ wherein:

Silica-PrSi-PEI is as defined hereinbefore, the + symbol indicates that all the amino groups of the PEI moiety have been converted to tertiary amino groups by alkylation addition to each amino nitrogen of up to two straight chain alkyl groups of from 1 to 4 carbon atoms and wherein at least about 30% of the tertiary amino groups of the PEI moiety have been quaternized by the addition to the amino nitrogens of the tertiary amino groups of a further straight chain alkyl group of from 1 to 4 carbon atoms, and $X^-$ is any suitable anion, but is preferably chlorine, bromine or iodine, and most preferably chlorine. The PEI is generally quaternized to about 30% to about 80% or more of theoretical, and is usually about 60% to about 70% quaternized.

The direct alkylation methylation of Silica-PrSi-PEI with an alkyl halide, such as methyl iodide, is not suitable for production of the novel quaternized polyethyleneimine solid phase supports of this invention due to the reaction of alkyl halide with primary and secondary amines producing N-alkylated species as well as the corresponding acid, for example, hydriodic acid if methyl iodide is employed as the alkylating agent. This acid would compete with the alkyl halide for quaternization and produce an undesirable mixture of alkylated quaternary and protonated quaternary products. Moreover, it was observed that such a reaction did not go to completion readily and produced widely varying reaction products.

It has been discovered that if all the primary and secondary amines in the PEI moiety are first converted to tertiary amines in an Eschweiler-Clarke reaction the product thereof can be readily converted to the desired quaternized polyethyleneimine bonded phase products of this invention by further reaction with a suitable quaternization agent.

Preferably, the primary and secondary amines of the PEI moiety are subjected to reductive alkylation, preferably methylation, in an Eschweiler-Clarke reaction employing formaldehyde and formic acid in a suitable solvent, such as, for example, deionized water or acetonitrile, preferably acetonitrile. The reaction is generally conducted for a period of up to about 2 to 3 hours at a temperature of up to about 80. While formaldehyde and formic acid are the preferred reactants for this reductive methylation, it is also possible to employ formaldehyde with sodium cyanoborohydride or sodium borohydride in trifluroacetic acid or acetonitrile.

The Silica-PrSi-PEI reactants in which the primary and secondary amine have been converted to tertiary amines are then quaternized, preferably with methyl chloride employing a suitable solvent, preferably acetonitrile, at a temperature of about 80 or more and under pressure, for example, under a pressure of from about 200 to 400 psi ($140.62 \times 10^3$ to $281.24 \times 10^3$ kg/m²) for a period of up to about 30 hours. Generally at least about 30% and preferably about 60% or more of the theoretical of the PEI moiety is quaternized.

The preferred quaternized derivatives of this invention are those in which the PEI-PrSi-Silica gel particulate silica gel has an average particle diameter of from about 5 to about 70 microns and an average pore size of from about 50 to about 1000 Angstrom units and the polyethyleneiminopropyl trimethoxy silane moiety has an average molecular weight of from about 400 to about 1200; and in which about 60% or more, preferably about 60% to 70% of theoretical of the PEI amino groups are quaternized.

The novel quaternized derivatives of covalently bound non-crosslinked polyethyleneimine silica based solid supports of this invention are especially useful as strong anion exchangers for column chromatography having a high capacity at high pH, i.e. about above pH 9, with an ability to bind basic proteins, such as, for example, cytochrome, lysozyme and the like, having isoelectric points above about pH 9. The quaternized products do not require titration to be useful and are rapidly equilibrated. These solid supports separate basic proteins with well-defined peaks and good selectivity and have a high capacity at high pH enabling quantitative recovery of protein. The novel bonded phase products are especially useful as packing for column chromatography and are particularly suitable with modern HPLC instrumentation. The packing may be of various mesh sizes, for example, from about 50 to about 600 mesh.

According to this invention, therefore, there are provided chromatographic columns suitable for liquid chromatography packed with (as the solid phase) the quaternized covalently bound, non-crosslinked polyethyleneimine reaction product of particulate silica gel having an average particle diameter of from about 1 to about 200, preferably about 3 to about 70, microns and an average pore size of from about 0 to about 1000, preferably about 50 to about 1000, Angstrom units, or particulate controlled pore glass having an average particle diameter of from about 1 to about 200, preferably about 37 to about 177, microns and an average pore size of from about 0 to about 8000, preferably about 40 to about 1000, Angstrom units, with polyethyleneiminopropyl trimethoxy silane having an average molecular weight of from about 400 to about 1800.

The products, their preparation and use according to the present invention are illustrated but not limited by the following illustrative examples.

In the following examples all percentages are by weight unless indicated otherwise and temperatures are in degrees C. The PEI-PrSi-Silica gel reactant employed is J. T. Baker Inc., BAKERBOND ® Silica gel product No. 7264-R, having an average particle diameter of about 40 microns unless indicated otherwise. Examples 1 to 12 illustrate the conversion of primary and secondary amine groups in PEI-PrSi-Silica gel to tertiary amine groups.

EXAMPLE 1

To a slurry of 15 grams of PEI-PrSi-Silica gel in 50 ml deionized water, in a 250 ml round bottom flask, 1.75 ml formaldehyde and 3.5 ml formic acid were added. An additional 45 ml water was added and the suspension was placed on a steam bath at a temperature of about 98-100. for about five hours. The product was filtered then washed 2x250 ml deionized water, 1×250 ml acetone and 2×250 ml chloroform and then dried at about 80° for about four hours. Elemental analysis of the PEI-PrSi-Silica gel in which the primary and secondary amine groups have been reductively methylated to tertiary amines was as follows: C=6.7, H=1.61, N=2.32, C/N=2.88.

EXAMPLE 2

To 100 ml of trifluoroacetic acid, in a 3-necked round bottom flask fitted with a condenser, a stirrer, a thermometer and a nitrogen inlet, cooled to 0-5° by an ice bath, 11.34 g of sodiumborohydride was added. A very exothermic reaction occurred and the temperature rose to about 25°, but was not permitted to go beyond 25°. After the addition of sodiumborohydride was complete, 7.0 g of paraformaldehyde was added and the ice bath removed and the mixture was stirred for about 10 minutes. Then 15 g of PEI-PrSi-Silica gel was added in less than about 5 minutes and the mixture allowed to warm to room temperature. After about four hours, water was added to dilute the reaction mixture which was then filtered, washed 2×250 ml deionized water. It took more than 24 hours for the filtration to be over and the product appeared gelatinous.

The solid product was suspended in 200 ml of 1 molar sodium carbonate for about 10 minutes at room temperature, filtered, washed 2×250 ml deionized water and 2×250 acetone. Elemental analysis: C=6.85, H=1.86, N=2.60, C/N=2.63.

EXAMPLE 2

To 15 g of PEI-PrSi-Silica gel placed in a 3-necked round bottom flask fitted with a condenser and a mechanical stirrer, 100 ml of acetonitrile was added, followed by 9 ml of formaldehyde. The suspension was stirred and 2.31 g of sodiumcyanoborohydride was added in one lot. After about two hours the reaction was stopped, filtered, washed 2×250 ml deionized water and 2×200 ml methanol and then dried at about 80 for about four hours. Elemental analysis: C=7.55, H=1.87, N=2.72, C/N=2.77.

EXAMPLE 4

In a 3-necked flask containing 15 g of PEI-PrSi-Silica gel 200 ml of acetonitrile was added followed by 5 ml of formaldehyde and 3 ml of formic acid. The mixture was stirred mechanically and heated to about 60. The mixture was stirred at 60 for about 19 hours. The mixture was then cooled at room temperature, filtered, washed 2×250 ml deionized water and 2×250 ml methanol.

An unusual slow filtration occurred. Vacuum was kept on for about 60 hours. The second methanol wash was not completely filtered. The whole solid was slurried with methanol and decanted. After which it was filtered again, washed 1×250 ml methanol and 2×250 ml acetone in another generally slow filtration and then dried at about 80. for about four hours. Elemental analysis: C=7.73, H=1.96, N=2.41, C/N=3.20.

EXAMPLE 5

In a 3-necked flask containing 15 g of PEI-PrSi-Silica gel (0.023g/atom nitrogen), 200 ml of deionized water was added. This was followed by addition of 5 ml of formaldehyde and 3 ml of formic acid. The mixture was stirred and heated at about 98 for about 18 hours. Thereafter the reaction mixture was cooled to room temperature, slowly filtered, washed 1×250 ml deionized water and 3×250 ml methanol and then dried at about 80. for about four hours. Elemental analysis: C=6.41, H=1.72, N=2.07, C/N=3.09.

EXAMPLE 6

To 15 g of PEI-PrSi-Silica gel (0.023g/atom nitrogen) in a 250 ml 3-necked round bottom flask fitted with a condenser, stirrer and a thermometer, 150 ml of acetonitrile was added, followed by 2 ml of formaldehyde and 3.5 ml of formic acid. The mixture was heated to about 81 and kept at that temperature for about five hours then cooled to room temperature, filtered, washed 3×250 ml deionized water and 3×250 ml methanol. The product was then dried at about 80. for about four hours. Elemental analysis: C=7.46, H=2.02, N=2.51, C/N=2.97.

EXAMPLE 7

To 20 g PEI-PrSi-Silica gel in a 3-necked flask fitted with a stirrer, a condenser and a thermometer, 100 ml of acetonitrile was added followed by 2.62 ml formaldehyde (37% solution) and 3 ml formic acid (88% solution). Then 30 ml acetonitrile was added and heating started. After the temperature reached 80., it was kept at that temperature for about 5 hours. The product was filtered, washed 3×250 ml deionized water and 3×250 ml methanol and then dried at about 80 for about four hours. Elemental analysis: C=7.99, H=1.48, N=2.59, C/N=3.08.

EXAMPLE 8

The preparation of Example 7 was repeated except that the reaction mixture was heated at about 80 for about 21 hours. The reaction mixture was then slowly filtered, washed 3×250 ml deionized water and 3×250 ml methanol and dried at about 80 for about four hours. Elemental analysis: C=7.95, H=1.62, N=2.58, C/N=3.08.

EXAMPLE 9

The preparation of Example 7 was again repeated except that the reaction mixture was heated at about 80 for about one and one-half hours, filtered, washed 3×250 ml deionized water and 3×250 ml methanol. The product was then dried at about 80° for about four hours. Elemental analysis: C=8.0%, H=1.70%, N=2.56%, C/N=3.12.

EXAMPLE 10

The preparation of Example 7 was again repeated except that the reactants were mixed and kept in a shaker at room temperature for about 22 hours. The reaction mixture was then filtered, washed 3×250 ml deionized water and 3×250 ml methanol and dried at about 80 for about four hours. Elemental analysis: C=7.19, H=1.49, N=2.61, C/N=2.75.

EXAMPLE 11

To a 3-necked round bottom 500 ml flask containing 40 g of PEI-PrSi-Silica gel (0.076 g/atom nitrogen), 200 ml of acetonitrile was added followed by addition of 5.25 ml formaldehyde (37% solution) and 6 ml formic acid (88% solution). Then 100 ml of acetonitrile was added to the reaction vessel and the mixture was heated to about 80. and kept at that temperature for about 3 hours. The reaction mixture was then filtered, washed 4×250 ml deionized water and 3×250 ml methanol and dried at about 80 for about four hours. Elemental analysis: C=7.63, H=1.69, N=2.54, C/N=3.00.

EXAMPLE 12

The product of Example 11 (20 g), 200 ml deionized water and 2.5 ml triethylamine were mixed in a 3-necked round bottom flask fitted with a stirrer, a condenser and a thermometer and heated to about 60. and kept at that temperature for about 19 hours. Then the reaction mixture was filtered, washed 3×250 ml deionized water and 3×250 ml methanol and dried at about 80. for about four hours. Elemental analysis: C=7.56, H=1.61, N=2.56, C/N=2.95.

The pH of the bonded phases (5% solution or 1 g of bonded phase in 20 ml deionized water) of both Examples 11 and 12 were measured. The pH was measured by first doing a two point calibration.

The pH of the product of Example 11 (before triethylamine washing)=5.05. The pH of the product of Example 2 (after triethylamine washing)=8.27. These results indicate the possible presence of formate salt complexes in Example 11 which will increase the apparent C/N ratio. However, the C/N ratio after the triethylamine wash indicates complete methylation.

Quaternization of PEI-PrSi-Silica solid supports in which the primary and secondary amino groups have been converted to tertiary amine groups is illustrated by the following Examples 13 to 18.

EXAMPLES 13-16

Each of the exhaustively methylated products of Examples 1, 4, 5 and 6 were subjected to the following processing. Product from the example was placed in autoclave glass liner, 100 ml acetonitrile was added and the glass liner was placed in a 3-liter rocking autoclave. An additional 100 ml of acetonitrile was added to the outside of the glass liner to prevent loss of volume inside the liner by evaporation. The autoclave was purged with helium ($3 \times 300$ psi) then methyl chloride ($1 \times 60$ psi). The autoclave was left open to the cylinder with two check valves to prevent draw back into the cylinder. The final pressure was 80 psi ($56.248 \times 10^3$ kg/m$^2$). The reaction was heated to about 80°, and was rocked for about 24 hours. The quaternized product as are dried at about 80. for about 4 hours and analyzed. Results of the analysis are reported in the following Table 1.

TABLE 1

| Example No. | Reactant Example No. | Pre-Quaternization Elemental analysis | C/N | Post-Quaternization Elemental Analysis | C/N | N/Cl |
|---|---|---|---|---|---|---|
| 13 | 1 | C = 6.7, H = 1.61, N = 2.32 | 2.88 | C = 7.47, H = 1.86, N = 2.25, Cl = 3.48 | 3.32 | 0.64 |
| 14 | 4 | C = 7.72, H = 1.96, N = 2.41 | 3.20 | C = 8.46, H = 2.06, N = 2.21, Cl = 4.24 | 3.82 | 0.52 |
| 15 | 5 | C = 6.41, H = 1.72, N = 2.07 | 3.09 | C = 6.84, H = 1.85, N = 1.88, Cl = 3.61 | 3.63 | 0.52 |
| 16 | 6 | C = 7.46, H = 2.02, N = 2.51 | 2.97 | C = 8.18, H = 2.01, N = 2.32, Cl = 4.14 | 3.52 | 0.56 |

EXAMPLE 17

In a bomb reaction vessel containing 12 g of the exhaustively methylated product of Example 9 and 150 ml acetonitrile, stirring was started and the mixture flushed once with methyl chloride. After equilibrating, methyl chloride was disconnected and heating commenced until a constant temperature of 80° was obtained. The reaction was maintained at that temperature and at a pressure of about 200 psi ($140.62 \times 10^3$ kg/m$^2$) for about 19 hours after which the heating was stopped and the reaction mixture permitted to cool to room temperature. The product was filtered, washed $2 \times 150$ ml acetonitrile and $2 \times 150$ ml methanol and dried at about 80° for about four hours.

EXAMPLE 18

Another quaternization reaction was conducted in a reaction identical to Example 17 except that 15 g of the exhaustively methylated, triethylamine washed product of Example 12 was employed as the reactant in place of the product of Example 9.

Analysis of the quaternized products of Examples 17 and 18 produced the results reported in Table 2.

TABLE 2

| Example No. | Reactant Example No. | Pre-Quaternization Elemental analysis | C/N | Post-Quaternization Elemental Analysis | C/N | N/Cl |
|---|---|---|---|---|---|---|
| 17 | 9 | C = 8.0, H = 1.70, N = 2.56 | 3.12 | C = 7.16, H = 1.73, N = 1.86, Cl = 3.97 | 3.84 | 0.46 |
| 18 | 12 | C = 7.56, H = 1.61, N = 2.56 | 2.95 | C = 7.15, H = 1.63, N = 1.74, Cl = 3.93 | 4.01 | 0.44 |

EXAMPLE 19

A standard analytical column (4.6 mm internal diameter $\times 50$ mm length) is slurry packed at high pressure (7.500 psi) with a quaternized derivative of PEI-PrSi-Silica gel (about 5 microns) obtained by a process as described in Example 13 as the bonded phase. The slurry consists of about 1.0 grams of the quaternized derivative of PEI-PrSi-Silica gel in 10 mls methanol. After pumping the slurry into the column, an additional 100 mls methanol are then pumped through the column at the same pressure. Chromatography of a protein sample containing 7 mg total protein (cytochrome C—horse heart type VI; chymotrypsinogen A—bovine pancreas; carbonic anhydrase—bovine erythrocyte; conalbumin II—bovine milk; ovalbumin—hen's egg; B-lactoglobulin B—bovine milk and β-lactoglobulin A—bovine milk) was conducted on said column with an initial (A) buffer of 25 mM Tris at pH 7.7, and an elution (B) buffer of 2 M NH$_4$OAc at pH 5.8 with a linear gradient of 100% A to 100% B over 30 minutes at a flow rate of 2.0 ml/min. at a back pressure of 400 psi. Proteins were detected by UV absorbance at 280 nm at 0.5 AUFS. The sample volume was 100 microliters and consisted of 7 mg total protein in buffer A. Each protein eluted as a concentrated band, well separated from each other. Typical mass recoveries for the individual proteins was greater than ninety-five percent of the original amount in the sample.

We claim:

1. A quaternized derivative of covalently bound, non-crosslinked polyethylene bonded phase silica, suitable for use in binding or separating basic proteins having a high pH isoelectric point, of the formula:

wherein Silica-PrSi-PEI is the covalently bound, non-crosslinked polyethyleneimine bonded phase which is the reaction product of
  (1) a silica which is selected from the group consisting of:
    a) particulate silica gel having an average particle diameter of from about 1 to 200 microns and an average pore size of from about 0 to 1000 Angstrom units or
    b) particulate controlled pore glass having an average particle diameter of from about 1 to about 200 microns and an average pore size of from about 0 to about 1000 Angstrom units, with
  (2) polyethyleneiminopropyl trimethoxy silane having an average molecular weight of from about 400 to about 1800,
  the + symbol indicates that all the amino groups of the PEI moiety have been converted to tertiary amino groups by reductive alkylation addition to each amino nitrogen of up to two straight chain alkyl groups of from 1 to 4 carbon atoms and wherein at least about 30% of the tertiary amino groups of the PEI moiety have been quaternized by the addition to the amino nitrogen of tertiary amino groups of a further straight chain alkyl groups of from 1 to 4 carbon; and
  $X^-$ is an anion.

2. A quaternized polyethyleneimine bonded phase silica of claim 1 wherein $X^-$ is selected from chlorine, bromine or iodine.

3. A quaternized polyethyleneimine bonded phase silica of claim 2 wherein $X^-$ is chlorine.

4. A quaternized polyethylene bonded phase silica of claim 3 wherein the PEI moiety is quaternized to at least 60% of the theoretical.

5. A quaternized polyethyleneimine bonded phase silica of claim 4 wherein the silica of the bonded phase is selected from particulate silica gel having an average particle diameter of from about 3 to about 70 microns and an average pore size of from about 50 to about 100 Å or particulate controlled pore glass having an average particle diameter of from about 1 to about 200 microns and an average pore size of from about 40 to about 1000 Å.

6. A quaternized polyethyleneimine bonded phase silica of claim 5 wherein the silica of the bonded phase is particulate silica gel having an average particle diameter of from about 3 to about 70 microns and an average pore size of from about 50 to about 1000 Å.

7. A quaternized polyethyleneimine bonded phase silica of claim 5 wherein the particulate silica gel has an average particle diameter of from about 5 to about 70 microns and an average pore size of from about 50 to about 1000 Å, and the polyethyleneiminopropyl silane moiety has an average molecular weight of from about 400 to about 1200.

8. A chromatographic column suitable for liquid chromatography comprising a column packed with a quaternized polyethyleneimine bonded phase derivative of claim 4.

9. A quaternized polyethyleneimine bonded phase silica of claim 3 wherein the silica of the bonded phase is selected from particulate silica gel having an average particle diameter of from about 3 to about 70 microns and an average pore size of from about 50 to about 1000 Å or particulate controlled pore glass having an average particle diameter of from about 1 to about 200 microns and an average pore size of from about 40 to about 1000 Å.

10. A quaternized polyethyleneimine bonded phase silica of claim 9 wherein the silica of the bonded phase is particulate silica gel having an average particle diameter of from about 3 to about 70 microns and an average pore size of from about 50 to about 1000 Å.

11. A quaternized polyethyleneimine bonded phase silica of claim 9 wherein the particulate silica gel has an average particle diameter of from about 5 to about 70 microns and an average pore size of from about 50 to about 1000 Å, and the polyethyleneiminopropyl silane moiety has an average molecular weight of from about 400 to about 1200.

12. A chromatographic column suitable for liquid chromatography comprising a column packed with a quaternized polyethyleneimine bonded phase derivative of claim 3.

13. A chromatographic column suitable for liquid chromatography comprising a column packed with a quaternized polyethyleneimine bonded phase derivative of claim 1.

* * * * *